Nov. 5, 1957  A. H. BREGGIN  2,812,513
PULSE MONITOR
Filed Nov. 17, 1955
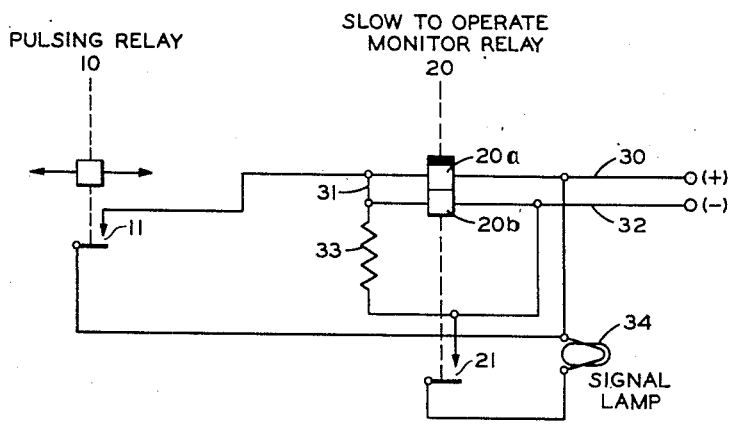
*INVENTOR.*
ARNOLD H. BREGGIN
BY
*Francis E. Blake*
ATTORNEY

United States Patent Office 2,812,513
Patented Nov. 5, 1957

2,812,513

PULSE MONITOR

Arnold H. Breggin, Rochester, N. Y., assignor to General Dynamics Corporation, a Delaware corporation Application November 17, 1955, Serial No. 547,441

2 Claims. (Cl. 340—271)

The present invention relates to indicating apparatus and more particularly to apparatus for indicating a variation or interruption in the production of electrical impulses.

There are many applications for regularly produced electric impulses. For example, regularly produced impulses may be used to periodically operate and release electrically operated or controlled devices under life test conditions. Since such life testing may extend over an appreciable length of time, it is often desirable to arrange for the test to be continuously running without constant supervision or observation by the test operator. Under these conditions, it is desirable to provide a signal or alarm which will indicate any variation or interruption in the production of the electrical impulses which are used to conduct the life test.

It is, therefore, a principal object of this invention to provide a simple and reliable signal or indicator for indicating a variation or interruption in the production of regularly produced electrical impulses such as, for example, a greater duration than a predetermined duration for a pulse or a greater interval than a predetermined interval between successive pulses.

Further objects and features of the invention will be apparent with reference to the following specification and drawing in which the sole figure thereof is a schematic wiring diagram.

Briefly stated, the basic feature of the invention is the provision of a slow-to-operate monitor signal relay having two separate energizing circuits. One of the energizing circuits is controlled to be energized during or in response to the duration of each regularly produced electrical impulse to be monitored. The other energizing circuit for the relay is controlled to be energized during the interval between the production of regularly produced electrical impulses to be monitored. The slow-to-operate relay is provided with operating characteristics such that it will not be operated by energization for a length of time equal or less than either the predetermined pulse duration or the predetermined interval between pulses to be monitored.. Therefore, so long as the regularly produced pulses are produced with a pulse duration or pulse interval between pulses of a predetermined amount not exceeding the operate time of the monitor signal relay, the relay will not operate and the production of the desired regularly produced pulses is indicated. However, if the production of regularly produced electrical impulses is varied or interrupted so that either the pulse duration or the interval between pulses exceeds the predetermined duration and thus the operate time of the monitor signal relay, the relay operates and, accordingly, may cause the energization of a signal lamp or other appropriate alarm device.

Referring now to the drawing for a detailed description of the invention, a pulsing relay is shown at 10 and it is understood that this relay may be operated in any suitable manner by the regularly produced electrical impulses to be monitored as may be obtained from a pulse source, not shown. Obviously, interrupter contacts or some other device, not shown, may be substituted for the pulsing relay 10 which, for purposes of the present description, may be considered to be the source of regularly produced electrical impulses to be monitored.

A monitor signal relay is shown at 20 and this relay is of the type having two windings 20a and 20b. The windings 20a and 20b may be of substantially the same electrical characteristics and are wound in the same direction for use in the circuit, as shown. However, the invention is not limited to the use of a monitor signal relay having windings of the same electrical characteristics since variations in the two windings may be provided so long as other suitable variations are made in the circuit to be described for purposes of obtaining the desired sequence in energization of the relay to be described.

Windings 20a and 20b are normally energized in series with each other by current flow from the positive terminal 30 of a direct-current power supply, not shown, through winding 20a in one direction and then through the electrical connection 31 and winding 20b in the opposite direction to the negative terminal 32 of the power supply. This arrangement is such that opposing fluxes in first and second directions, respectively, are created in the windings 20a and 20b which tend to cancel each other so that the relay does not operate. However, it will be noted that an additional energizing path for the upper winding 20a is provided from the power supply terminal 30 through the winding 20a, the electrical connection 31, and the resistor 33 to the power supply terminal 32. Thus, in such manner, the winding 20a is provided with more current flow than the winding 20b and is normally energized to provide a greater flux than the opposing flux of winding 20b so that the monitor signal relay tends to operate by the excess of flux in the first direction produced by the winding 20a for the duration of an interval between pulses.

Whenever the pulsing relay 10 is operated for the duration of a pulse, contacts 11 are closed to connect the positive terminal 30 of the power source through the connection 31 and the lower winding 20b of the monitor relay 20 to the negative terminal 32 of the power source. It will be noted that at the same time that the relay contacts 11 are closed to energize the lower winding 20b in the second direction, the energization of the upper winding 20a of the monitor relay 20 is shunted to deenergize winding 20a so that the monitor relay 20 now tends to operate by only the flux produced in the second direction in its lower winding 20b for the duration of a pulse.

It should now be understood that the slow-to-operate monitor relay 20 tends to operate by flux in the first direction in winding 20a during the interval between production of pulses for operating the pulsing relay 10 and tends to operate by flux in the second direction through the lower winding 20b for the duration of the pulse operating the pulsing relay 10. So long as the operate time for the relay 20 is greater than the duration of the pulse operating the pulsing relay 10 or the interval between the pulses during which the pulsing relay 10 is released, the monitor signal relay is not operated even though it is tended to be operated by the aforementioned production of fluxes. A significant feature of this monitor signal circuit is that the tendency of the monitor signal relay to operate by the pulse duration is produced by a flux in one direction while the tendency of the signal relay to operate during the pulse interval is produced by a flux in the opposite direction so that there is no accumulation of flux which would tend to cause a faulty operation of the signal relay 20 by either rapidly recurring pulses or an accumulation of time during which pulses are regularly produced. The same alternate production of opposite fluxes tending to operate the relay assures that the relay will be restored after it has been previously operated by a variation or interruption in the production of regularly produced pulses to be monitored.

Any suitable signal or alarm device may be caused to operate in response to the operation of the monitor signal relay 20. For example, as shown in the drawing, the operation of the monitor signal relay 20 will close contacts 21 to complete a circuit for energizing an alarm signal lamp 34 from the positive terminal 30 of the power supply to the negative terminal 32. Also, the operation or non-operation of the signal relay 20 may itself be an indication of the pulse conditions to be monitored.

It should be understood that the slow-to-operate characteristics of the monitor signal relay 20 may be obtained in any normal manner, such as the use of a flux modifying slug. It should also be understood that the minimum frequency of pulse occurrence which may be monitored by the signal circuit of the invention is, of course, limited by the maximum operate time which can be provided for the slow-to-operate signal relay 20 and for all practical purposes it is believed that a lower limit of pulse frequencies to be monitored would be approximately twelve impulses per second.

Various modifications may be made within the spirit of the invention and the scope of the appended claims.

What is claimed is:

1. A monitor signal for indicating a variation in the production of regularly produced electrical pulses comprising in combination with a source of regularly produced pulses to be monitored, a slow-to-operate relay, said relay having first and second windings, a first circuit for energizing both of said windings to produce substantially equal fluxes with the flux in the first winding being in a first direction and the flux in the second winding being in a second direction to oppose each other, a second circuit for additionally energizing said first winding only to provide additional flux in the first direction for tending to operate said slow-to-operate relay by the excess of flux in the first direction, a third circuit including means responsive to a pulse from said pulse source for shunting the energization of said first winding by said first and second means and for energizing said second winding only to produce a flux in the second direction tending to operate said slow-to-operate relay, said slow-to-operate relay having an operate time greater than either the pulse duration or pulse interval whereby said relay tends to operate by the flux in the first direction in said first winding during a pulse interval and tends to operate by the flux in the second direction in said second winding for the pulse duration but does not operate unless either the pulse interval or pulse duration exceeds the operate time of the relay, and means responsive to the operation of said relay to indicate a variation in the regular production of pulses from said pulse source.

2. A monitor signal for indicating a variation in the production of regularly produced electrical pulses comprising in combination with a source of regularly produced pulses to be monitored, a slow-to-operate relay, said relay having first and second windings of substantially the same electrical characteristics, a first circuit for energizing both of said windings to produce substantially equal fluxes with the flux in the first winding being in a first direction and the flux in the second winding being in a second direction to oppose each other, a second circuit for additionally energizing said first winding only to provide additional flux in the first direction for tending to operate said slow-to-operate relay by the excess of flux in the first direction, a third circuit including means responsive to a pulse from said pulse source for shunting the energization of said first winding by said first and second means and for energizing said second winding only to produce a flux in the second direction tending to operate said slow-to-operate relay, said slow-to-operate relay having an operate time greater than either the pulse duration or pulse interval whereby said relay tends to operate by the flux in the first direction in said first winding during a pulse interval and tends to operate by the flux in the second direction in said second winding for the pulse duration but does not operate unless either the pulse interval or pulse duration exceeds the operate time of the relay, and means responsive to the operation of said relay to indicate a variation in the regular production of pulses from said pulse source.

References Cited in the file of this patent

UNITED STATES PATENTS 2,442,427    Mullerheim _____ June 1, 1948